(12) United States Patent
Yang

(10) Patent No.: US 11,977,421 B2
(45) Date of Patent: May 7, 2024

(54) FOLDABLE HINGE AND ELECTRONIC DEVICE

(71) Applicant: BEIJING XIAOMI MOBILE SOFTWARE CO., LTD., Beijing (CN)

(72) Inventor: Jieming Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 242 days.

(21) Appl. No.: 17/733,113

(22) Filed: Apr. 29, 2022

(65) Prior Publication Data

US 2023/0151656 A1 May 18, 2023

(30) Foreign Application Priority Data

Nov. 12, 2021 (CN) .......................... 202111342141.8

(51) Int. Cl.
| | | |
|---|---|---|
| *G06F 1/16* | (2006.01) | |
| *E05D 3/12* | (2006.01) | |
| *E05D 3/18* | (2006.01) | |
| *E05D 11/08* | (2006.01) | |

(52) U.S. Cl.
CPC .......... *G06F 1/1681* (2013.01); *E05D 3/122* (2013.01); *E05D 3/18* (2013.01); *E05D 11/082* (2013.01); *G06F 1/1652* (2013.01); *E05Y 2900/606* (2013.01)

(58) Field of Classification Search
CPC .... G06F 1/1681; G06F 1/1652; G06F 1/1641; H04M 1/022; E05D 3/18; E05D 3/122; E05D 11/082
See application file for complete search history.

(56) References Cited

U.S. PATENT DOCUMENTS

| | | | | |
|---|---|---|---|---|
| 9,348,450 B1* | 5/2016 | Kim | ..................... | H04M 1/0268 |
| 11,032,402 B2* | 6/2021 | Liu | ..................... | H04M 1/0216 |
| 11,467,633 B2* | 10/2022 | Liao | ..................... | H04M 1/0268 |
| 11,706,886 B2* | 7/2023 | Wu | ..................... | G06F 1/1681 |
| | | | | 361/807 |

(Continued)

FOREIGN PATENT DOCUMENTS

| | | |
|---|---|---|
| WO | WO 2021115462 A1 | 6/2021 |
| WO | WO 2021129882 A1 | 7/2021 |
| WO | WO 2021173116 A1 | 9/2021 |

OTHER PUBLICATIONS

European Patent Application No. 22172888.4, Search and Opinion dated Nov. 10, 2022, 14 pages.

*Primary Examiner* — Jeffrey O'Brien
(74) *Attorney, Agent, or Firm* — COZEN O'CONNOR

(57) ABSTRACT

A foldable hinge includes a base and two folding assemblies on both sides of the base and coupled to the base. The two folding assemblies are foldable relative to each other. Each folding assembly includes a rotating arm and a support member; a first end of the rotating arm is rotatably coupled to the base; the support member is rotatably coupled to a second end of the rotating arm away from the base; a side of the support member close to the base is rotatably coupled to the base and the support member is slidable in a direction approaching or away from the base. A distance between portions of two support members coupled to the rotating arms is smaller than a distance between portions of the two support members coupled to the base in response to bringing the two folding assemblies together.

19 Claims, 11 Drawing Sheets

(56) References Cited

U.S. PATENT DOCUMENTS

| | | | |
|---|---|---|---|
| 11,723,170 B2* | 8/2023 | Ohyama | G06F 1/1626 |
| | | | 361/679.27 |
| 11,758,672 B2* | 9/2023 | Morino | H05K 5/0226 |
| | | | 361/807 |
| 11,792,946 B2* | 10/2023 | Park | H05K 5/0017 |
| | | | 361/679.01 |
| 11,792,947 B2* | 10/2023 | Kim | F16C 11/04 |
| | | | 361/807 |
| 11,825,620 B2* | 11/2023 | Zhao | G06F 1/1616 |
| 11,846,991 B2* | 12/2023 | Feng | G06F 1/1624 |
| 11,846,997 B2* | 12/2023 | Liao | G06F 1/1616 |
| 11,868,182 B2* | 1/2024 | Cui | G06F 1/1681 |
| 11,880,232 B2* | 1/2024 | Lee | G06F 1/1652 |
| 11,885,164 B2* | 1/2024 | Yang | H04M 1/022 |
| 11,886,255 B2* | 1/2024 | Lee | G06F 1/1641 |
| 11,889,644 B2* | 1/2024 | Yang | H05K 5/0226 |
| 2021/0181808 A1* | 6/2021 | Liao | G06F 1/1641 |
| 2023/0093901 A1* | 3/2023 | Hsu | G06F 1/1616 |
| | | | 361/679.01 |
| 2023/0217616 A1* | 7/2023 | Park | G06F 1/1679 |
| | | | 361/807 |
| 2023/0229189 A1* | 7/2023 | Li | G06F 1/1616 |
| 2023/0229203 A1* | 7/2023 | Hsiang | G06F 1/1681 |
| | | | 361/679.27 |
| 2023/0240029 A1* | 7/2023 | Hashimoto | G06F 1/1681 |
| | | | 361/807 |
| 2023/0244274 A1* | 8/2023 | Lin | G06F 1/1616 |
| | | | 361/679.27 |
| 2023/0358653 A1* | 11/2023 | Lee | G06F 1/1656 |
| 2023/0366248 A1* | 11/2023 | Chung | G06F 1/1681 |
| 2023/0384822 A1* | 11/2023 | Lee | G06F 1/1681 |
| 2023/0409090 A1* | 12/2023 | Hong | G09F 9/30 |
| 2024/0004430 A1* | 1/2024 | Zhao | G06F 1/1652 |

\* cited by examiner

FOLDABLE HINGE AND ELECTRONIC DEVICE

CROSS-REFERENCE TO RELATED APPLICATIONS

This application is based on and claims priority to Chinese Patent Application No. 202111342141.8 filed on Nov. 12, 2021, the entire contents of which are incorporated herein by reference for all purposes.

BACKGROUND

With the development of technology, foldable screens are widely used in the technical field of electronic equipment, and the technology for drop-shaped foldable screens is relatively mature at present. Foldable hinges of such foldable screens can help achieve the folding function while avoiding damage to the screen because the folding angle is too big.

In order to configure the foldable screens to be drop-shaped, the foldable hinges usually have many elements, resulting in a complex structure of the foldable hinges.

SUMMARY

The present disclosure relates to the field of electronic equipment and, more particularly, to a foldable hinge and an electronic device.

Embodiments of the present disclosure propose a foldable hinge that includes a base and two folding assemblies on both sides of the base and coupled to the base, and the two folding assemblies are foldable relative to each other. Each folding assembly includes a rotating arm and a support member; a first end of the rotating arm is rotatably coupled to the base; the support member is rotatably coupled to a second end of the rotating arm away from the base; a side of the support member close to the base is rotatably coupled to the base and the support member is slidable in a direction approaching or away from the base. A distance between portions of two support members coupled to the rotating arms is smaller than a distance between portions of the two support members coupled to the base in response to bringing the two folding assemblies together.

In another aspect, embodiments of the present disclosure propose an electronic device, including two housings, a flexible screen, and a foldable hinge. The foldable hinge includes a base and two folding assemblies on both sides of the base and coupled to the base, and the two folding assemblies are foldable relative to each other. Each folding assembly includes a rotating arm and a support member; a first end of the rotating arm is rotatably coupled to the base; the support member is rotatably coupled to a second end of the rotating arm away from the base; a side of the support member close to the base is rotatably coupled to the base and the support member is slidable in a direction approaching or away from the base. A distance between portions of two support members coupled to the rotating arms is smaller than a distance between portions of the two support members coupled to the base in response to bringing the two folding assemblies together. The two housings are coupled to rotating arms of the two folding assemblies correspondingly, and the flexible screen is coupled to the two housings.

BRIEF DESCRIPTION OF DRAWINGS

In order to illustrate the technical solutions in embodiments of the present disclosure more clearly, the accompanying drawings used in the description of the embodiments will be described briefly. The accompanying drawings described below merely show some of the embodiments of the present disclosure, and other drawings can be obtained by those skilled in the art based on these accompanying drawings, without involving any inventive work.

DETAILED DESCRIPTION OF EMBODIMENTS

Unless otherwise defined, technical terms or scientific terms used herein shall be understood in the ordinary sense as appreciated by those of ordinary skill in the art to which the present application belongs. Terms such as "first," "second" and "third" used in the specification and claims are not intended to indicate any sequence, quantity or significance of indicated technical features, and are merely used to distinguish different elements. Likewise, the words "a," "an" and the like used in the specification and claims are not intended to limit the quantity but indicate the presence of at least one element or device referred to by the words. The term "a plurality of" or "several" means two or more than two. Terms "comprising" or "containing" mean that the elements or articles before these terms "comprising" or "containing" includes the elements or articles listed after the terms "comprising" or "containing" and do not exclude other elements or articles. Terms "connected" or "coupled" and the like are not limited to physical or mechanical connection, but may include electrical connection, regardless of direct connection or indirect connection. Terms "up," "down," "left," "right" and the like are merely used to indicate relative positions, and when an object described changes its absolute position, the relative positions may also change correspondingly.

In order to make the purpose, technical solutions and advantages of the present disclosure clearer, embodiments of the present disclosure will be described in detail in conjunction with the accompanying drawings.

Figure 1:
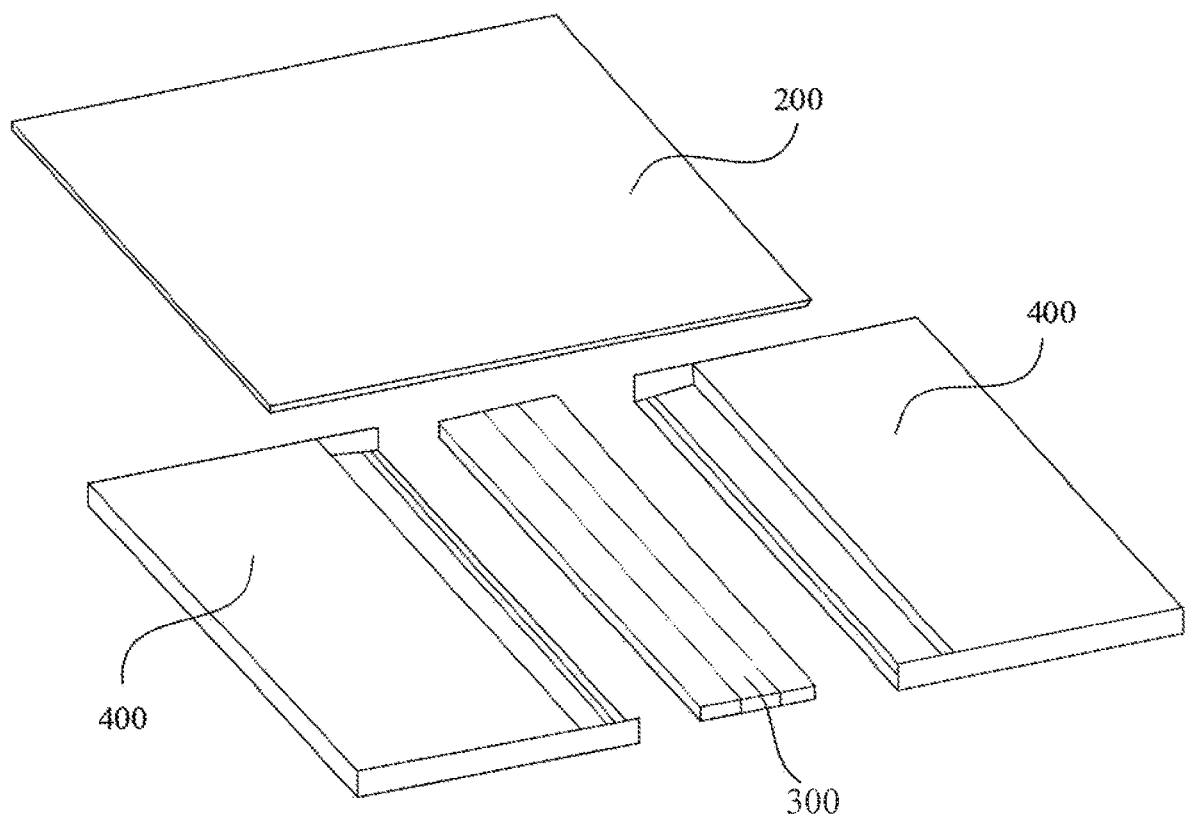
FIG. 1 is a schematic diagram showing an electronic device in accordance with an embodiment of the present disclosure.

FIG. 1 is a schematic diagram showing an electronic device in accordance with an embodiment of the present disclosure. As shown in FIG. 1, the electronic device includes a foldable hinge 300, two middle frames 400, and a flexible screen 200. The two middle frames 400 are each coupled to the foldable hinge 300. The flexible screen 200 is coupled to the two middle frames 400. During a folding process of the electronic device, the two middle frames 400 may open and close relative to each other under an action of the foldable hinge 300, and the flexible screen 200 may be bent under an action of the middle frames 400.

Figure 2:
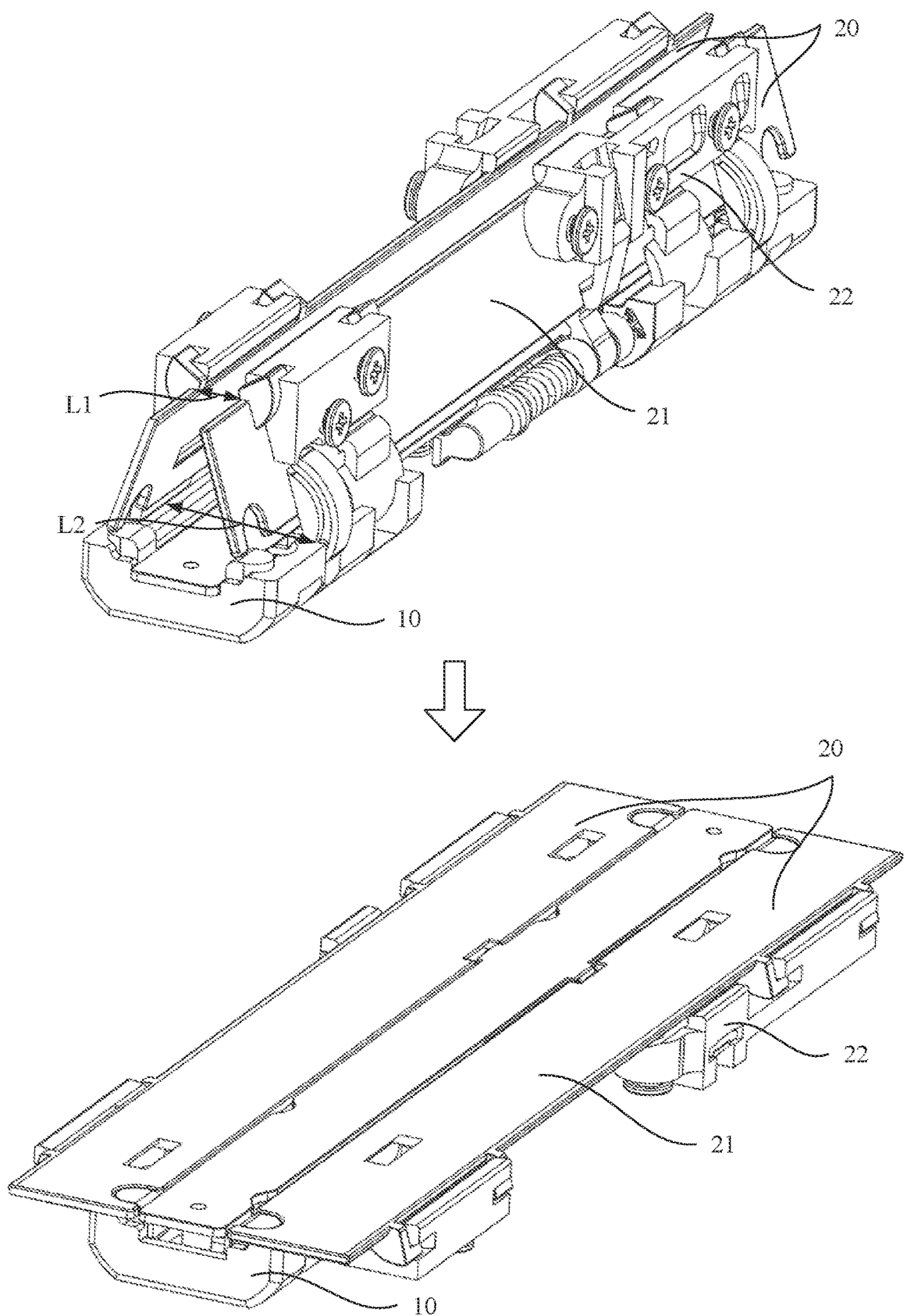
FIG. 2 is a schematic diagram showing a foldable hinge in accordance with an embodiment of the present disclosure.

FIG. 2 is a schematic diagram showing a foldable hinge in accordance with an embodiment of the present disclosure. As shown in FIG. 2, the foldable hinge includes a base 10 and two folding assemblies 20.

The two folding assemblies 20 are on both sides of the base 10 and coupled to the base 10, and the two folding assemblies 20 may open and close relative to each other, realizing a folding function of the foldable hinge.

As shown in FIG. 2, each folding assembly 20 includes a rotating arm 22 and a support member 21. A first end of the rotating arm 22 is rotatably coupled to the base 10, and the support member 21 is rotatably coupled to a second end of the rotating arm 22 away from the base 10. A side of the support member 21 close to the base 10 is rotatably coupled to the base 10, and the support member 21 is slidable in a direction approaching or away from the base 10. When the two folding assemblies 20 are brought together, a distance L1 between portions of two support members 21 coupled to the rotating arms 22 is smaller than a distance L2 between portions of the two support members 21 coupled to the base 10.

Since the first end of the rotating arm is rotatably coupled to the base, the support member is rotatably coupled to the second end of the rotating arm away from the base, and the side of the support member close to the base is rotatably coupled to the base, when the two folding assemblies are brought together, the rotating arms and the support members rotate relative to the base, and the support members can slide in the direction away from the base. Moreover, when the two folding assemblies are brought together, the distance between the portions of the two support members coupled to the rotating arms is smaller than the distance between the portions of the two support members coupled to the base, such that the two support members and the base form a drop-shaped receiving space, and no squeezing force or stretching force is exerted on the flexible screen when the flexible screen is received in the drop-shaped receiving space, preventing the flexible screen from creasing or even being damaged. In a process of relative unfolding of the two folding assemblies, the rotating arms and the support members rotate relative to the base, and the support members can slide in the direction approaching the base, such that the two support members are restored to an unfolded state, and the flexible screen is spread out on the two support members and the base. Three elements—the base, the rotating arms, and the support members—can form the drop-shaped receiving space, reducing the number of elements and making the structure simpler and more compact.

In some examples, each folding assembly 20 may include one or more rotating arms 22. In an embodiment of the present disclosure, each folding assembly 20 includes two rotating arms 22 on a common side of the support member 21, and the rotating arms 22 are close to two ends of the support member 21.

When the foldable hinge is folded, the two support members 21 rotate facing each other; the two rotating arms 22 rotate facing each other; the support members 21 rotate relative to the rotating arms 22 and relative to the base 10, and slide in the direction approaching the base 10. When the foldable hinge is folded until the two folding assemblies 20 come together, the distance between the portions of the two support members 21 coupled to the rotating arms 22 is smaller than the distance between the portions of the two support members 21 coupled to the base 10, and the two support members 21 and the base 10 enclose the drop-shaped receiving space.

When the foldable hinge is unfolded, the two support members 21 rotate in a direction away from each other; the two rotating arms 22 rotate in a direction away from each other; the support members 21 rotate relative to the rotating arms 22 and relative to the base 10, and slides in the direction away from the base 10. In a process that the foldable hinge is gradually unfolded, as the two support members 21 rotate in the direction away from each other relative to the base 10 and the two support members 21 slide in the direction away from the base 10, the two support members 21 gradually rotate to a common surface, which can provide good support for the flexible screen.

Figure 3:
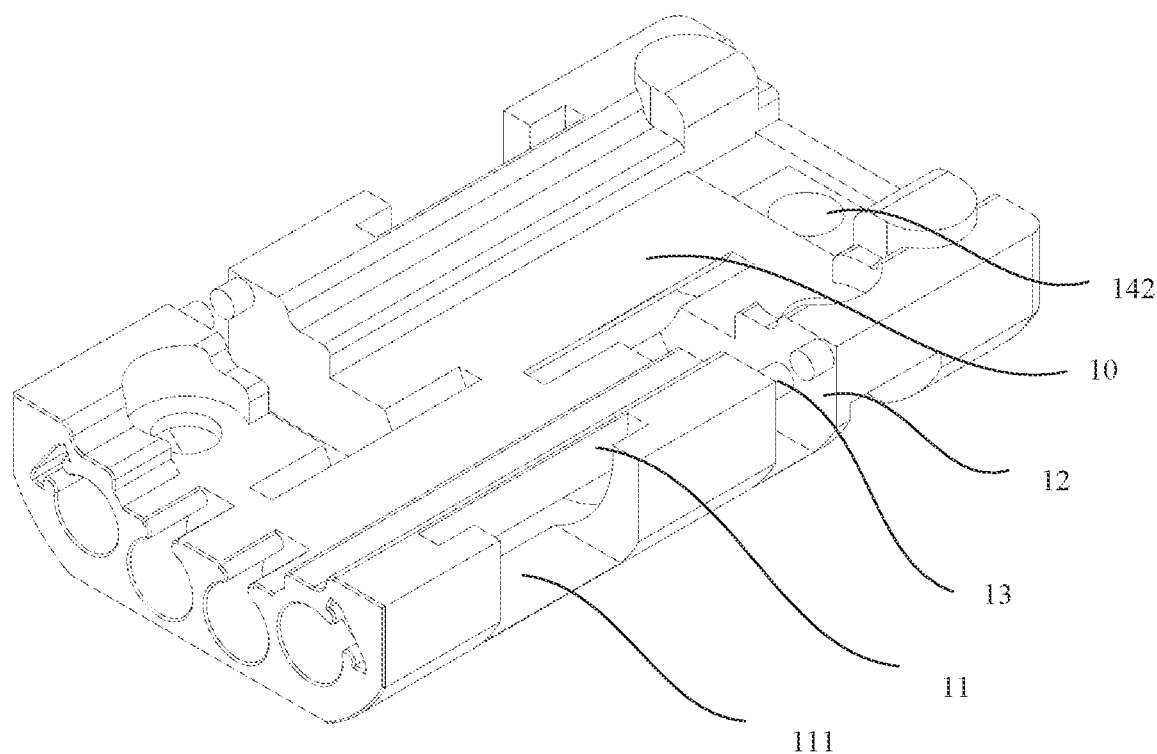
FIG. 3 is a schematic diagram showing a part of a base in accordance with an embodiment of the present disclosure.

FIG. 3 is a schematic diagram showing a part of a base in accordance with an embodiment of the present disclosure. As shown in FIG. 3, a surface of the base 10 has a first circular arc groove 11. In an embodiment of the present disclosure, the first circular arc groove 11 is on a top surface of the base 10. The top surface of the base 10 is a surface of the base 10 close to the flexible screen in the unfolded state.

Figure 4:
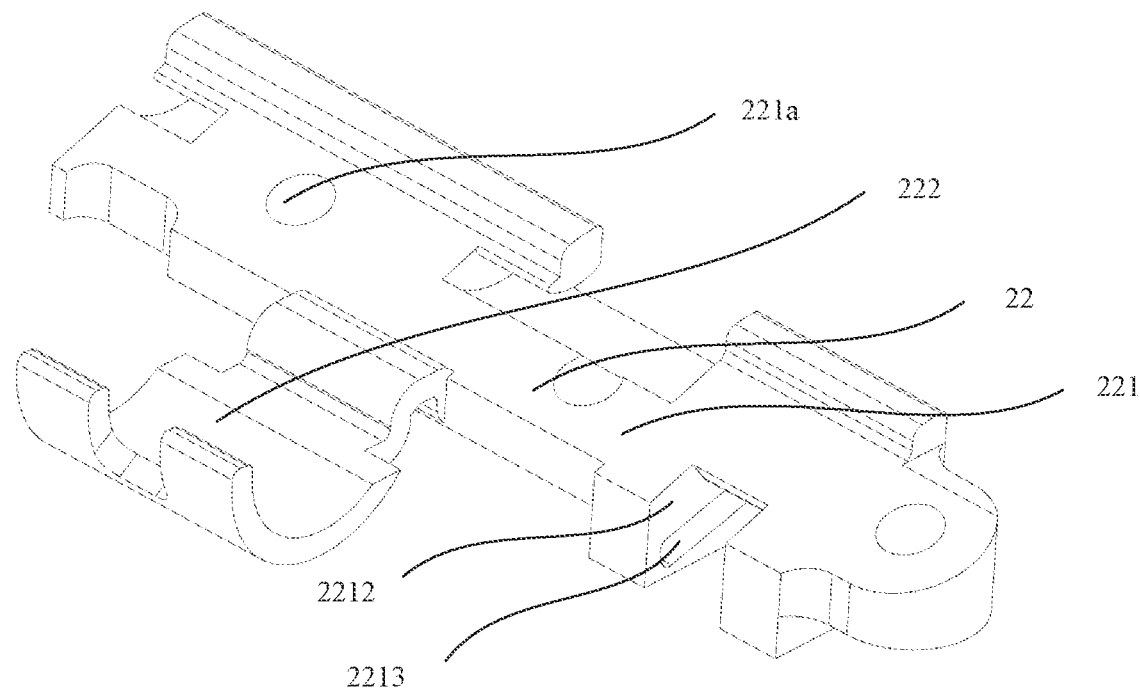
FIG. 4 is a schematic diagram showing a rotating arm in accordance with an embodiment of the present disclosure.

FIG. 4 is a schematic diagram showing a rotating arm in accordance with an embodiment of the present disclosure. As shown in FIG. 4, the rotating arm 22 of the folding assembly 20 includes a first body portion 221 and a first arc arm 222, and an end of the first arc arm 222 is coupled to the first body portion 221.

The first body portion 221 also has a connection hole 221a. By installing a screw into the connection hole 221a, the rotating arm 22 can be coupled to two housings of the electronic device, such that the rotating arm 22 and the two housings are formed into one piece, which is beneficial to the installation of the flexible screen.

Figure 5:
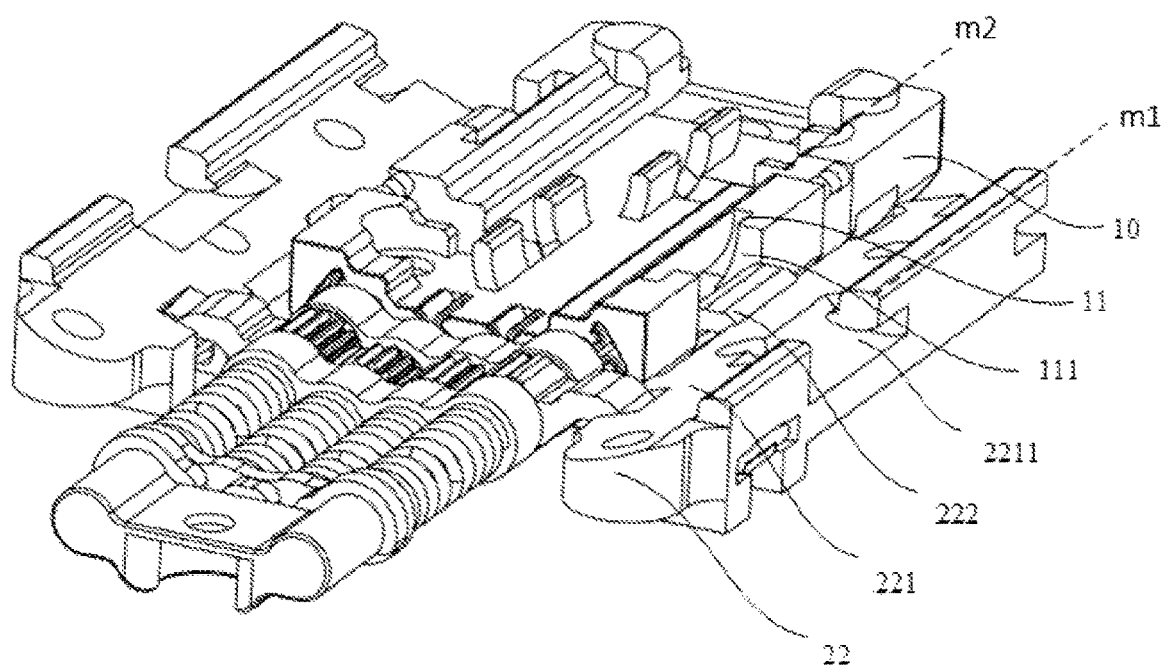
FIG. 5 is a schematic diagram showing connection between a rotating arm and a base in accordance with an embodiment of the present disclosure.

FIG. 5 is a schematic diagram showing connection between a rotating arm and a base in accordance with an embodiment of the present disclosure. As shown in FIG. 5, the first arc arm 222 is in the first arc groove 11 and is slidable along the first arc groove 11.

By assembling the first arc arm 222 in the first circular arc groove 11, the rotating arm 22 can rotate around an axis of the first arc groove 11 relative to the base 10, realizing transition of the folding assembly from a flattened state to a closed state. The first arc arm 222 and the first arc groove 11 cooperate with each other to form a virtual axis type connection, which can hide a connection structure of the rotating arm 22 and the base 10 inside the base 10 and make the foldable hinge more compact.

In some examples, the first circular arc groove 11 may be a quarter arc, one-third arc, or the like, and the first arc arm 222 may be a quarter arc, one-third arc, or the like. A person skilled in the art can adapt specific parameters of the first circular arc groove 11 and the first arc arm 222 to actual needs.

In an embodiment of the present disclosure, each of the first circular arc groove 11 and the first arc arm 222 is a one-third arc.

As shown in FIG. 3, the first arc groove 11 also has an avoidance notch 111 at an opening of the first arc groove 11. Referring to FIG. 5, the avoidance notch 111 is on a side wall of the base 10 close to the rotating arm 22. The avoidance notch 111 can avoid the rotating arm 22, so that the rotating arm 22 has more room for rotation.

When the folding assembly 20 is in the unfolded state, the rotating arm 22 is in the avoidance notch 111, and the first arc arm 222 is mounted in the first arc groove 11. During the folding of the folding assembly 20, the rotating arm 22 rotates to an outer side of the avoidance notch 111, and the first arc arm 222 slides along the first arc groove 11 toward an outer side of the first arc groove 11. When the folding assembly 20 is in the folded state, an end of the first arc arm 222 away from the first body portion 221 is in the first circular arc groove 11.

As shown in FIG. 5, the first body portion 221 of the rotating arm 22 has a second circular arc groove 2211, an axis m1 of the second circular arc groove 2211 being parallel to an axis m2 of the first arc arm 222. The second circular arc groove 2211 is used for connection with the support member 21.

Figure 6:
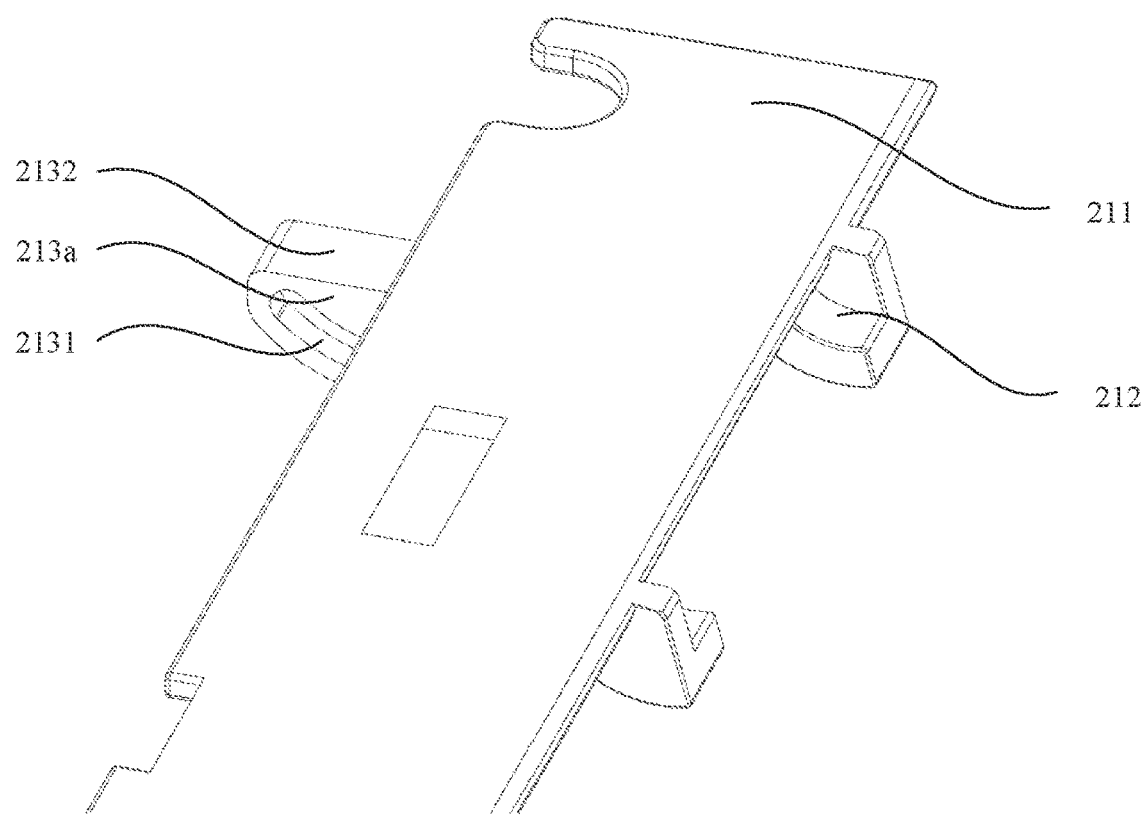
FIG. 6 is a schematic diagram showing a part of a support member in accordance with an embodiment of the present disclosure.

FIG. 6 is a schematic diagram showing a part of a support member in accordance with an embodiment of the present disclosure. As shown in FIG. 6, the support member 21 includes a first support plate 211, a second arc arm 212, and a connection block 213, and an end of the second arc arm 212 is coupled to the first support plate 211.

The connection block 213 and the second arc arm 212 are on a common side of the first support plate 211, and the connection block 213 is coupled to the first support plate 211. A half-moon-shaped side wall of the connection block 213 has a first guiding sliding slot 2131.

Figure 7:
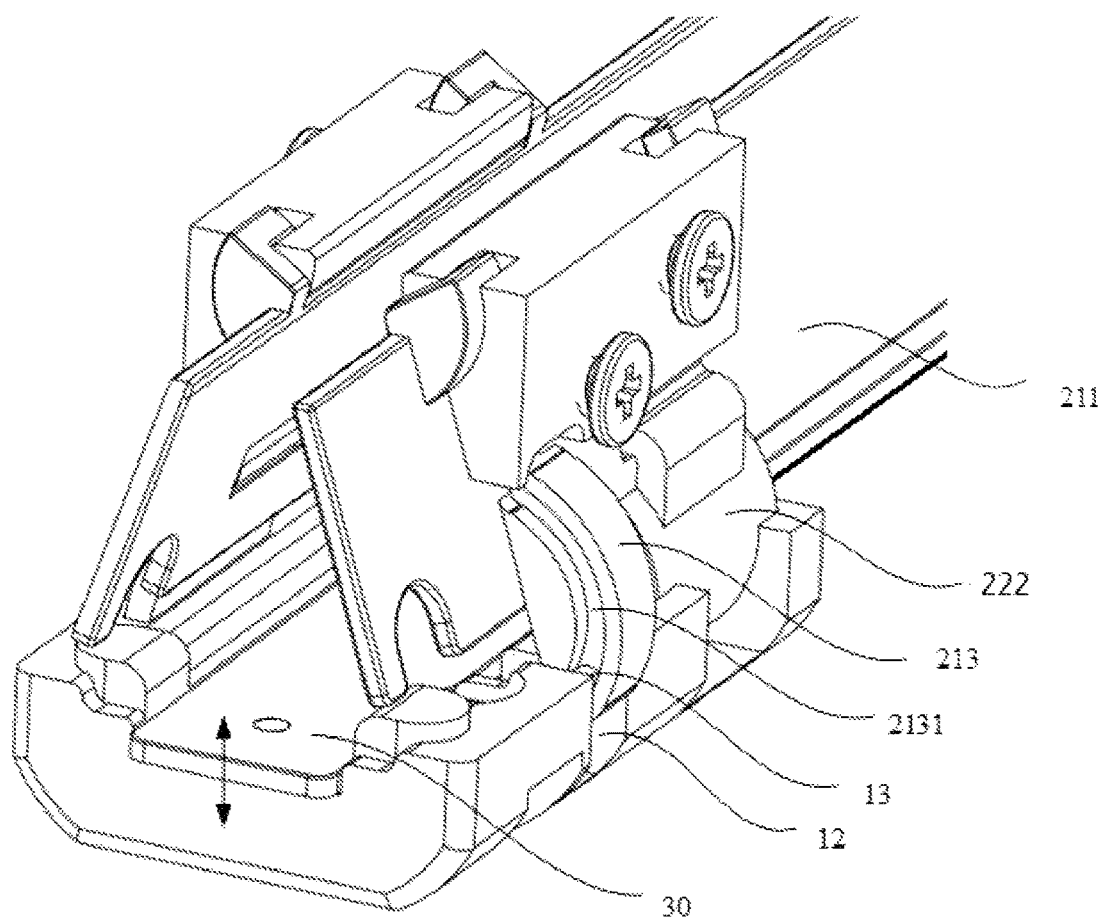
FIG. 7 is a schematic diagram showing a part of a folded hinge in a folded state in accordance with an embodiment of the present disclosure.

FIG. 7 is a schematic diagram showing a part of a folded hinge in a folded state in accordance with an embodiment of the present disclosure. As shown in FIG. 7, the second arc arm 212 is in the second circular arc groove 2211 and is slidable along the second circular arc groove 2211.

The second arc arm 212 is assembled in the second circular arc groove 2211 to achieve a rotational connection between the rotating arm 22 and the support member 21, so that the rotating arm 22 has a certain degree of freedom of rotation. Cooperation between the second arc arm 212 and the second circular arc groove 2211 constitutes a virtual axis type connection, which can hide the connection structure between the rotating arm 22 and the base 10 inside the base 10 and make the foldable hinge more compact.

Since the axis m1 of the second circular arc groove 2211 is parallel to the axis m2 of the first arc arm 222, a rotation axis of the support member 21 relative to the rotating arm 22 and a rotation axis of the rotating arm 22 relative to the base 10 are parallel. In a process of folding or unfolding the folding assembly 20, the support member 21 and the rotating arm 22 as well as the rotating arm 22 and the base 10 can rotate smoothly, and there will be no obvious gap, improving the stability of the foldable hinge.

In some examples, the second circular arc groove 2211 may be a quarter arc, one-third arc, or the like; and the second arc arm 212 can be a quarter arc, one-third arc, or the like. A person skilled in the art can adapt specific parameters of the second arc arm 212 and the second circular arc groove 2211 to actual needs.

In an embodiment of the present disclosure, each of the first circular arc groove 11 and the first arc arm 222 is a quarter arc.

Referring again to FIG. 3, the surface of the base 10 also has a first recess 12 on a side of the first circular arc groove 11, and a side wall of the first recess 12 has a pin shaft 13. As shown in FIG. 7, the connection block 213 of the support member 21 is in the first recess 12 and the pin shaft 13 is in the first guiding sliding slot 2131.

By mounting the connection block 213 in the first recess 12 and mounting the pin shaft 13 in the first guiding sliding slot 2131, a rotational connection between the support member 21 and the base 10 can be realized; the support member 21 can be rotated at any angle relative to the base 10 during folding; and a connection structure of the connection block 213 and the first recess 12 can be hidden inside the base 10, making the foldable hinge more compact. In a process of opening and closing the folding assemblies 20 relative to the base 10, the pin shaft 13 slides in the first guiding sliding slot 2131, enabling a sliding connection between the support member 21 and the base 10.

When the folding assembly 20 is in the unfolded state, the connection block 213 is in the first recess 12 and the pin shaft 13 is at a first end of the first guiding sliding slot 2131 close to the support member 21. In the process of bringing the folding assemblies 20 together, the connection block 213 rotates with the pin shaft 13 as a center, and the pin shaft 13 slides along the first guiding sliding slot 2131 toward a second end of the first guiding sliding slot 2131 away from the support member 21. When the folding assemblies 20 are in the folded state, the pin shaft 13 is at the second end of the first guiding sliding slot 2131 away from the support member 21.

As shown in FIG. 7, the first guiding sliding slot 2131 exhibits a circular arc shape, and the pin shaft 13 makes a circular arc movement relative to the support member 21 during rotation of the rotating arm 22.

In this example, a cross-sectional shape of the pin shaft 13 is circular. In other examples, the cross-sectional shape of the pin shaft 13 may also be polygonal.

In this example, each of two opposing side walls of the first recess 12 has a pin shaft 13, and two pins 13 are arranged coaxially. Each of two side walls of the connection block 213 have a first guiding sliding slot 2131, and the two pins 13 slide in the two first guiding sliding slots 2131 correspondingly, which can make the sliding between the support members 21 and the base 10 more stable.

Referring to FIGS. 6 and 7, a portion 213a of the connection block 213 protrudes relative to a side edge of the first support plate 211 close to the base 10, and the portion 213a of the connection block 213 has a support surface 2132. The foldable hinge also includes a second support plate 30 between the two folding assemblies 20, and the second support plate 30 is movably coupled to the base 10 and can move relative to the base 10 in a direction approaching or away from the base 10. A direction of movement of the second support plate 30 is schematically illustrated with arrows in FIG. 7.

Figure 8:
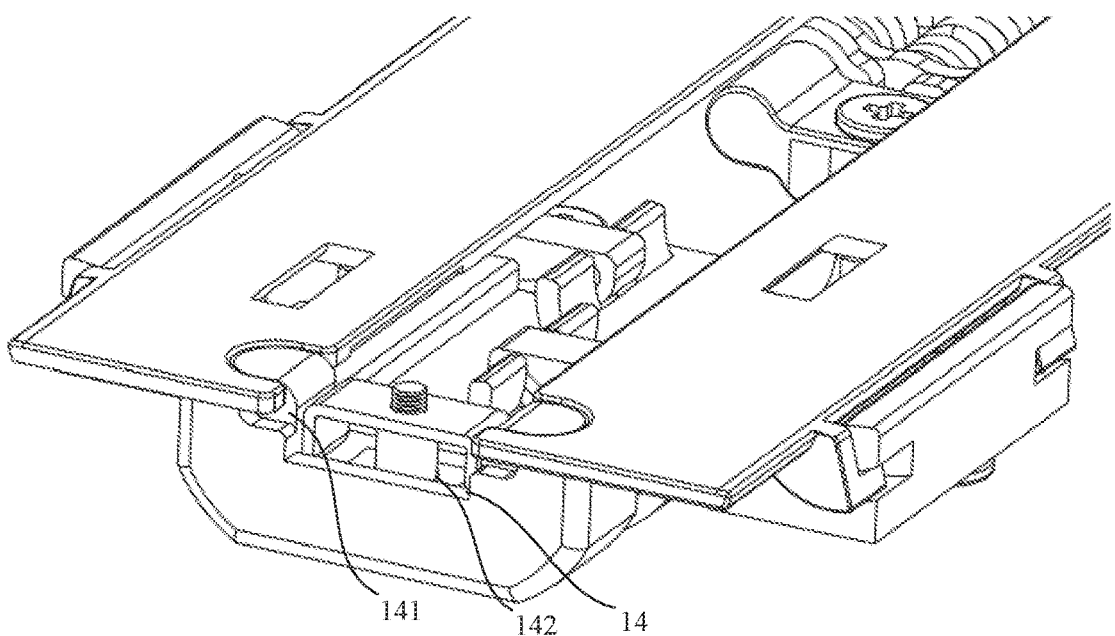
FIG. 8 is a schematic diagram showing a part of a folded hinge in an unfolded state in accordance with an embodiment of the present disclosure.

FIG. 8 is a schematic diagram showing a part of a folded hinge in an unfolded state in accordance with an embodiment of the present disclosure. The second support plate 30 is omitted in FIG. 8. When the two folding assemblies 20 are unfolded, the portion 213a of the connection block 213 is on a side of the second support plate 30 close to the base 10, and the support surface 2132 is in contact with a surface of the second support plate 30 close to the base 10. That is, the portion 213a of the connection block 213 moves to below the second support plate 30 and the support surface 2132 contacts a lower surface of the second support plate 30, to hold the second support plate 30. Referring to FIG. 7, the support surface 2132 is separated from the second support plate 30 when the two folding assemblies 20 are brought together.

When the two folding assemblies 20 are unfolded, the connection block 213 is in the first recess 12 and right below the second support plate 30. A surface of the connection block 213 close to the second support plate 30 is in contact with the second support plate 30, in which case the connection block 213 can support the second support plate 30 and hold up the second support plate 30. In the process of bringing the two folding assemblies 20 together, along with the rotation of the support member 21, the connection block 213 gradually rotates to a lateral side of the second support plate 30, in which case the connection block 213 is separated from the second support plate 30, and the second support plate 30 loses support and moves in the direction close to the base 10, enlarging the drop-shaped receiving space formed when the folding assemblies 20 is in the folded state.

Figure 9:
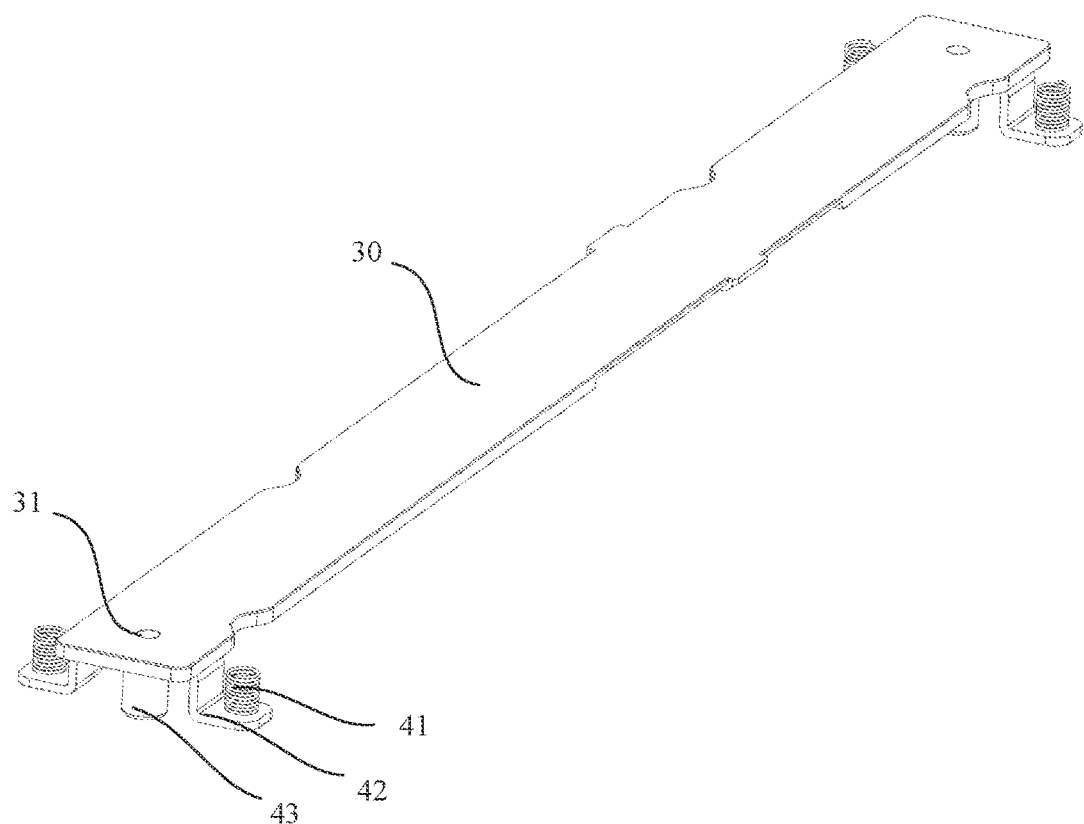
FIG. 9 is a schematic diagram showing a second support plate in accordance with an embodiment of the present disclosure.

FIG. 9 is a schematic diagram showing a second support plate in accordance with an embodiment of the present disclosure. As shown in FIG. 9, the foldable hinge also includes an elastic member 41 and a connection bracket 42, and the second support plate 30 is mounted on the base 10 by the elastic member 41 and the connection bracket 42.

Figure 10:
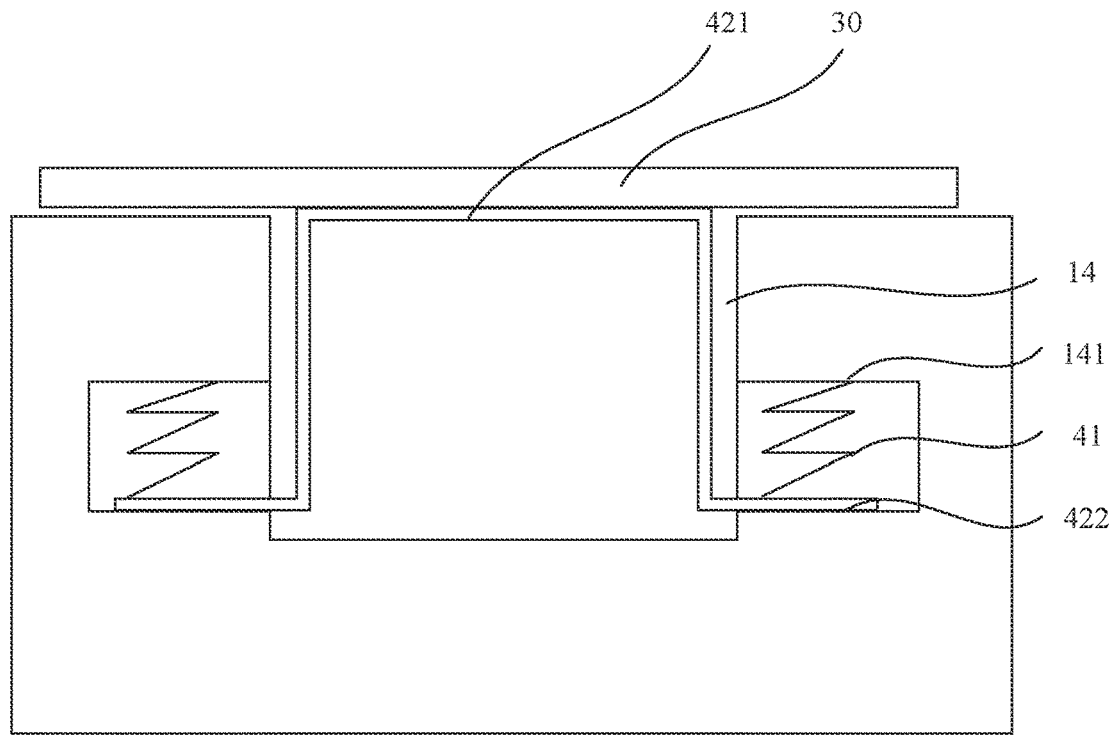
FIG. 10 is a schematic diagram showing a foldable hinge in accordance with an embodiment of the present disclosure.

FIG. 10 is a schematic diagram showing that the second support plate and the base are assembled in accordance with an embodiment of the present disclosure. As shown in FIG. 10, a surface of the base 10 close to the second support plate 30 has a first mounting slot 14, and a side wall of the first mounting slot 14 has a limiting recess 141. The connection bracket 42 includes a second body portion 421 and a limiting portion 422. The second body portion 421 is in the first mounting slot 14. The limiting portion 422 is in the limiting recess 141. The elastic member 41 is in the limiting recess 141, and the elastic member 41 is between the limiting portion 422 and a side wall of the limiting recess 141. The second body portion 421 is coupled to the second support plate 30.

The elastic member 41 and the connection bracket 42 are provided so that the second support plate 30 can move in the direction close to the base 10 relative to the base 10 under an elastic force of the elastic member 41. During the unfolding of the two folding assemblies 20, the second support plate 30 moves in the direction away from the base 10 under the support of the connection block 213, until the second support plate 30 is flush with the two first support plates 211, in which case the second support plate 30 and the two first support plates 211 can spread the flexible screen flat. When the two folding assemblies 20 are folded, the second support plate 30 moves in the direction close to the base 10 under the action of the elastic member 41 until the second support plate 30 is in contact with the base 10, which is conducive to increasing the receiving space enclosed by the second support plate 30 and the two first support plates 211, reducing or avoiding extrusion and collision caused by the foldable hinge to a folding part of the flexible screen, and effectively protecting the folding part of the flexible screen.

The elastic member 41 is between the limiting portion 422 of the connection bracket 42 and the side wall of the limiting recess 141 and is in a compressed state. When the two folding assemblies 20 are unfolded, the connection block 213 contacts the second support plate 30. Since the connection block 213 has a supporting effect on the second support plate 30, the elastic force of the elastic member 41 on the limiting recess 141 is not sufficient to drive the connection bracket 42 and the second support plate 30 to move in the direction close to the base 10, in which case the second support plate 30 is flush with the two first support plates 211. Referring to FIG. 7, the first support plate 211 rotates relative to the base 10 when the two folding assemblies 20 are brought together, in which case the connection block 213 is separated from the second support plate 30, and the second support plate 30 is in the first mounting slot 14.

In some examples, the elastic member 41 is a spring.

Figure 11:
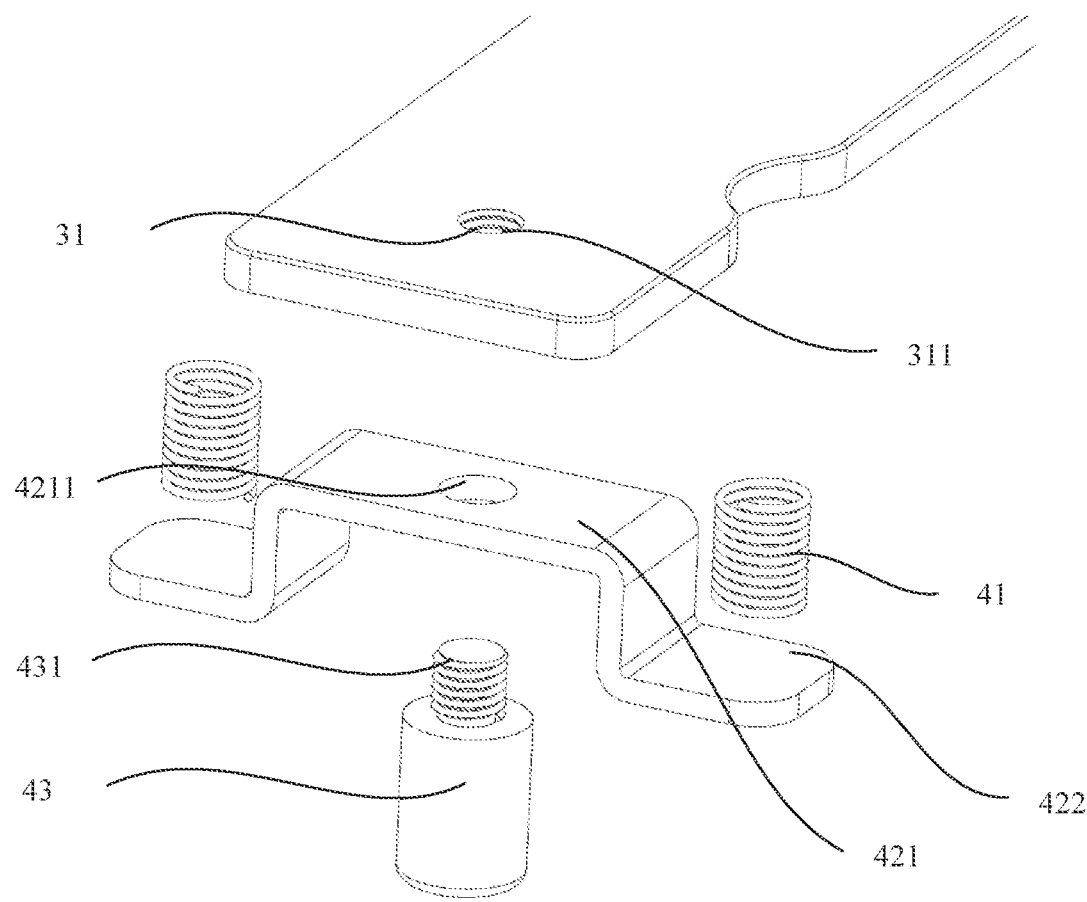
FIG. 11 is a schematic diagram showing installation of a second support plate in accordance with an embodiment of the present disclosure.

FIG. 11 is a schematic diagram showing that a second support plate and a connection bracket are assembled in accordance with an embodiment of the present disclosure. As shown in FIG. 11, a surface of the second body portion 421 has a first through-hole 4211, the second support plate 30 has a second through-hole 31, the second through-hole 31 is opposite the first through-hole 4211, and an inner side wall of the second through-hole 31 has a first thread 311. The foldable hinge also includes a guide member 43. An end of the guide member 43 close to the connection bracket 12 has a second thread 431, and the guide member 43 is mounted in the first through-hole 4211 and the second through-hole 31. The guide member 43 is fixedly coupled to the second support plate 30 by cooperation of the first thread 311 and the second thread 431.

Referring to FIG. 8, the first mounting slot 14 has a guide hole 142 in a bottom of the first mounting slot, and the guide member 43 has a first end coupled to the connection bracket 42 and the second support plate 30 and a second end inserted in the guide hole 142. The guide hole 142 is arranged in the bottom of the first mounting slot 14, and the guide member 43 is in the guide hole 142 and is movable relative to the guide hole 142, enabling the second support plate 30 to move more stably.

Figure 12:
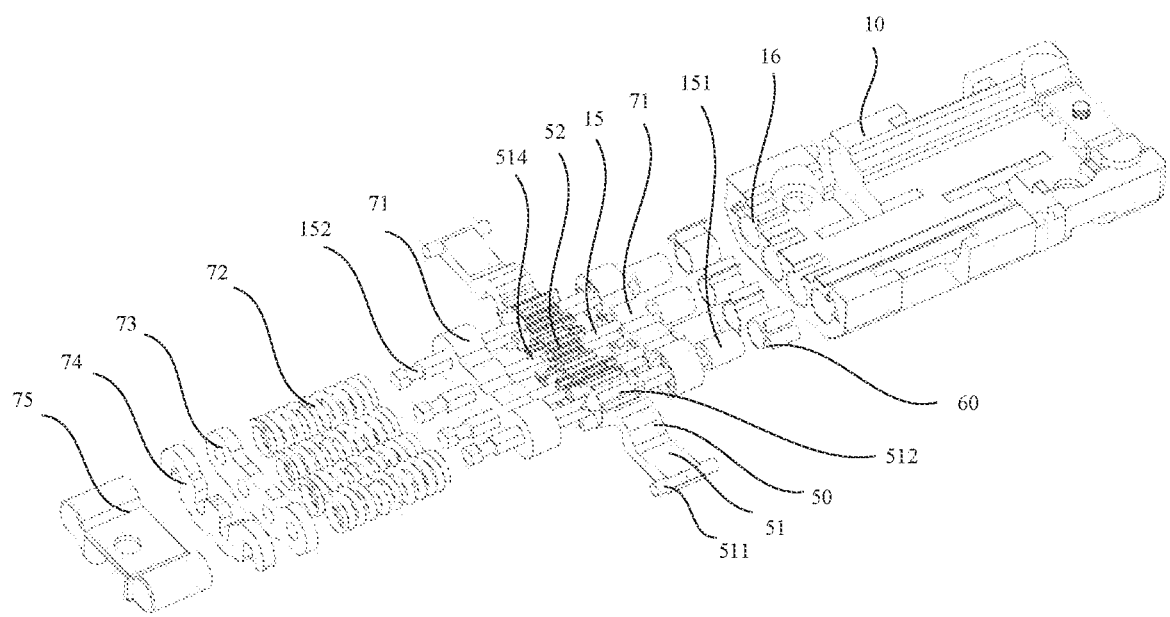
FIG. 12 is a partially exploded view of a foldable hinge in accordance with an embodiment of the present disclosure.

FIG. 12 is a partially exploded view of a foldable hinge in accordance with an embodiment of the present disclosure. At least the rotating arm 22 and the support member 21 are omitted in the figure. As shown in FIG. 12, the foldable hinge also includes a synchronization assembly 50. The synchronization assembly 50 is in the base 10, and the synchronization assembly 50 is coupled to the two folding assemblies 20. Due to the arrangement of the synchronization assembly 50, it is possible to synchronize the movement of the two folding assemblies 20.

As shown in FIG. 12, the synchronization assembly 50 includes two synchronizing swing arms 51 extending to both sides of the base 10 correspondingly, and the two synchronizing swing arms 51 are transmissively coupled. Each synchronizing swing arm 51 has a first end rotatably coupled to the base 10 and a second end slidingly coupled to the first body portion 221.

Referring to FIG. 4, the first body portion 221 of the rotating arm 22 has a second recess 2212 on a side wall of the first body portion close to the base 10, and a side wall of the second recess 2212 has a second guiding sliding slot 2213. Referring to FIG. 12, the second end of the synchronizing swing arm 51 away from the base 10 has a connection shaft 511, and the connection shaft 511 is in the second guiding sliding slot 2213.

The connection shaft 511 is mounted in the second guiding sliding slot 2213 to enable a sliding connection between the synchronizing swing arm 51 and the rotating arm 22. The rotation axis of the rotating arm 22 is not coaxial with the synchronizing swing arm 51. During rotation of the rotating arm 22, the connection shaft 511 slides relative to the second guiding sliding slot 2213, so that the rotating arm 22 can drive the synchronizing swing arm 51 to rotate, and the synchronizing swing arm 51 can drive the rotating arm 22 to rotate.

Figure 13:
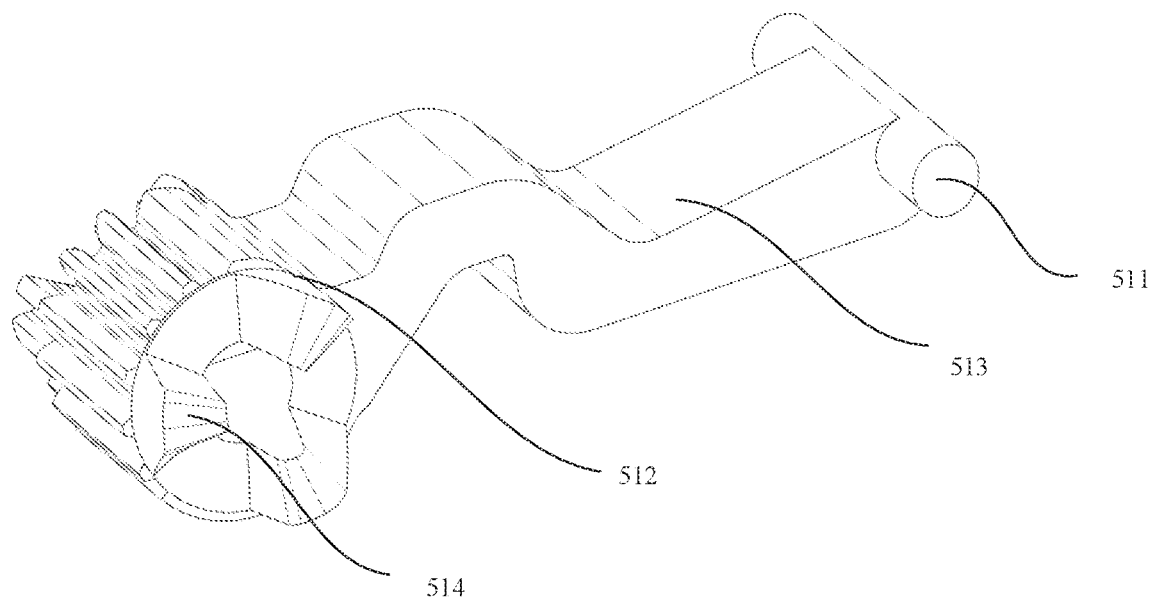
FIG. 13 is a schematic diagram showing a synchronizing swing arm in accordance with an embodiment of the present disclosure.

FIG. 13 is a schematic diagram showing a synchronizing swing arm in accordance with an embodiment of the present disclosure. As shown in FIG. 13, the synchronizing swing arm 51 includes a gear portion 512 and a third body portion 513, and the gear portion 512 and the connection shaft 511 are at two ends of the third body portion 513, correspondingly.

In some examples, the gear portions 512 of the two synchronizing swing arms 51 engage, so that the gear portions 512 of the two synchronizing swing arms 51 cooperate with each other to enable the two synchronizing swing arms 51 to rotate synchronously.

In an embodiment of the present disclosure, referring to FIG. 12, the synchronization assembly 50 also includes a plurality of synchronizing gears 52 that engage with each other, and the gear portions 512 of the two synchronizing swing arms 51 are transmissively coupled by the plurality of synchronizing gears 52. During rotation of one synchronizing swing arm 51, the other synchronizing swing arm 51 is driven by the transmission of the plurality of synchronous gears 52, achieving synchronous rotation of the two synchronizing swing arms 51.

As shown in FIG. 12, the foldable hinge further includes a plurality of mounting shafts 15 in the base 10. A part of the mounting shafts 15 are inserted in the gear portions 512 and circumferentially limited by the gear portions 512, and another part of the mounting shafts 15 are inserted in the synchronizing gears 52 and circumferentially limited by the synchronizing gears 52. The foldable hinge further includes a plurality of damping rings 60 fitted over the plurality of mounting shafts 15 correspondingly. The damping rings 60 are in interference fit with the mounting shafts 15, and the plurality of damping rings 60 are fixedly coupled to the base 10.

Figure 14:
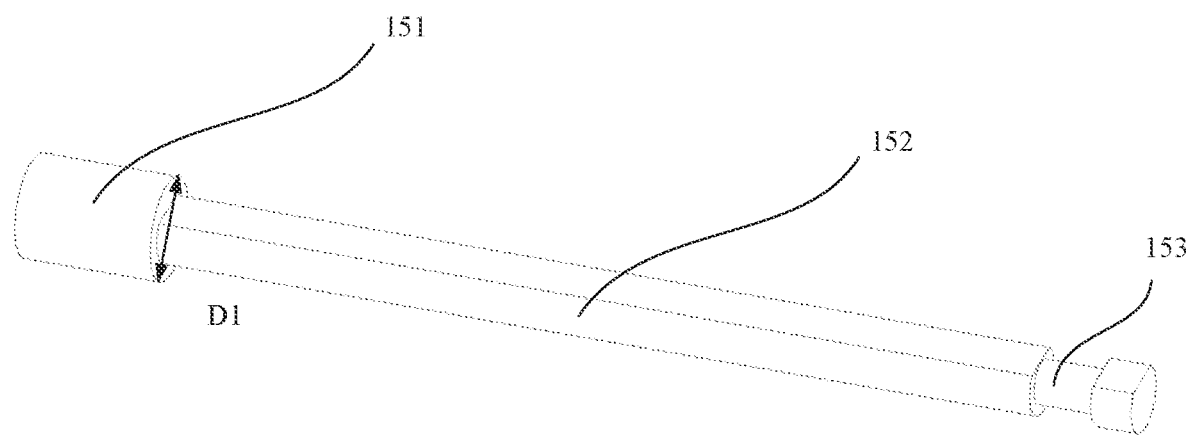
FIG. 14 is a schematic diagram showing a mounting shaft in accordance with an embodiment of the present disclosure.

FIG. 14 is a schematic diagram showing a mounting shaft in accordance with an embodiment of the present disclosure. As shown in FIG. 14, the mounting shaft 15 includes a friction segment 151 and a mounting segment 152, and the friction segment 151 is at a first end of the mounting segment 152. The mounting segment 152 has a snap slot 153 at a second end of the mounting segment 152 away from the friction segment 151. The mounting segment 152 is used to cooperate with the gear portion 512 or the synchronizing gear 52, which is fitted over the mounting segment 152.

In some examples, the mounting segment 152 has a polygonal cross-section, and the mounting segment 152 is inserted into the gear portion 512 or the synchronizing gear 52 and can form circumferential limitation with the gear portion 512 or the synchronizing gear 52. The mounting shaft 15 is circumferentially stationary relative to the gear portion 512 or the synchronizing gear 52 fitted over the mounting segment 152, but can perform axial relative displacement.

As shown in FIG. 12, the side wall of the base 10 has a damping ring mounting hole 16, and the damping ring 60 is fixedly mounted in the damping ring mounting hole 16. The friction segment 151 of the mounting shaft 15 is mounted in the damping ring 60.

Figure 15:
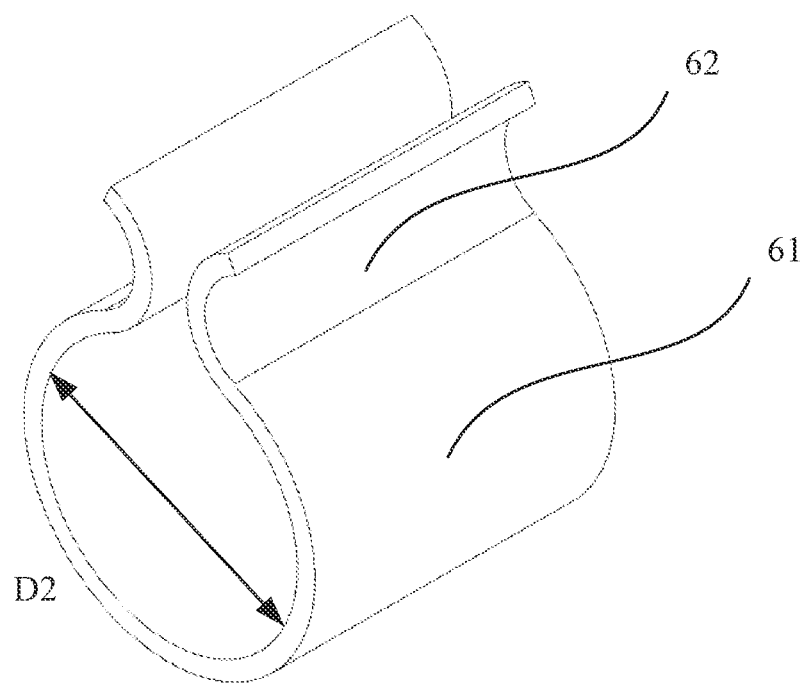
FIG. 15 is a schematic diagram showing a damping ring in accordance with an embodiment of the present disclosure.

As an example, FIG. 15 is a schematic diagram showing a damping ring in accordance with an embodiment of the present disclosure. As shown in FIG. 15, the damping ring 60 includes a C-shaped segment 61 and a turnup segment 62, and the cross-section of the damping ring 60 has an open ring structure overall to facilitate the installation of the friction segment 151 into the damping ring 60. The C-shaped segment 61 is a columnar structure with a C-shaped cross-section, and the turnup segment 62 is coupled to both ends of the C-shaped segment 61. The cross-sectional shape of the damping ring 60 matches the shape of the damping ring mounting hole 16, and the turnup segment 62 is used to cooperate with the damping ring mounting hole 16 to limit the damping ring 60 and avoid the rotation of the damping ring 60. The C-shaped segment 61 is fitted over the friction segment 151. An outer diameter D1 of the friction segment 151 is greater than an inner diameter D2 of the C-shaped segment 61, enabling the C-shaped segment 61 to form an interference fit with the friction segment 151.

In some examples, the damping ring 60 may be a metal member, which has strong plasticity and is easy to bend into a corresponding shape.

During the rotation of the two folding assemblies 20, the synchronizing swing arms 51 also rotate. Since the mounting shaft 15 is circumferentially limited by the gear portion 512, the synchronizing swing arm 51 may drive the mounting shaft 15 to rotate, driving the mounting shaft 15 to rotate relative to the damping ring 60. The outer diameter D1 of the friction segment 151 is larger than the inner diameter D2 of the C-shaped segment 61, so that the damping ring 60 forms the interference fit with the friction segment 151 and the damping ring 16 grips the friction segment 151. There is friction between an inner wall of the damping ring 60 and outer outer wall of the friction segment 151, and the friction becomes resistance, preventing the rotation of the mounting shaft 15. The friction between the damping ring 60 and the friction segment 151 allows the two folding assemblies 20 to remain in their current state without a sufficiently large external force for folding. Thus, the electronic device can hover at any angle within a range of angles at which it can be opened and closed.

Referring to FIG. 12, the foldable hinge also includes two self-locking plates 71, a locking spring 72, a spring stop 73, a snap plate 74, and an insertion tail plate 75. Both self-locking plates 71 are fitted over the mounting segment 152 of the mounting shaft 15, with one of the self-locking plates 71 abutting an end of the friction segment 151. The gear portion 512 of the synchronizing swing arm 51 is fitted over the mounting segment 152 and is between the two self-locking plates 71. The locking spring 72 and the spring stop 73 are sequentially fitted over the mounting segment 152. The locking spring 72 is on a side of the two self-locking plates 71 away from the mounting segment 152 and abuts against one of the two self-locking plates 71 which is farther away from the mounting segment 152. The spring stop 73 is at an end of the locking spring 72 away from the self-locking plate 71 and abuts against the locking spring 72. The snap plate 74 is snapped at the snap slot 153.

The foldable hinge also includes the insertion tail plate 75 coupled to the base 10. The insertion tail plate 75 is at an end of the mounting shaft 15 away from the friction segment 151. The insertion tail plate 75 is used to axially limit the mounting shaft 15 to prevent the mounting shaft 15 from coming out of the damping ring 60 under a spring force of the locking spring 72.

Figure 16:
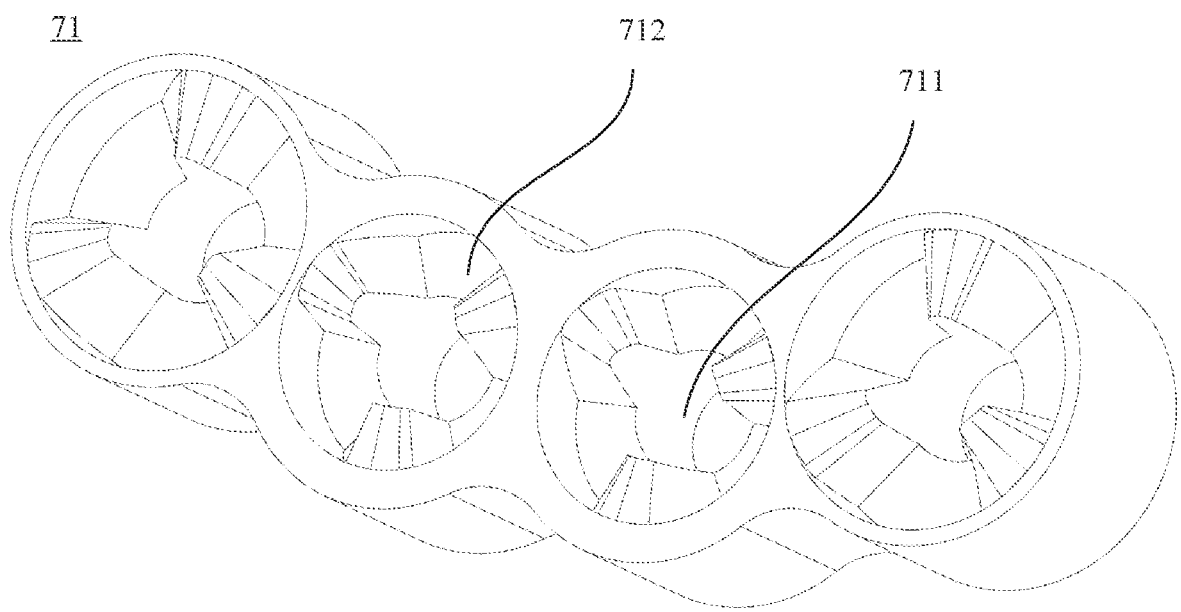
FIG. 16 is a schematic diagram showing a self-locking plate in accordance with an embodiment of the present disclosure.

FIG. 16 is a schematic diagram showing a self-locking plate in accordance with an embodiment of the present disclosure. As shown in FIG. 16, the self-locking plate 71 has a plurality of mounting holes 711, and the mounting shafts 15 are coaxially inserted in the mounting holes 711 of the self-locking plate 71, and the mounting shafts 15 and the self-locking plate 71 have a clearance fit. A side wall of the self-locking plate 71 close to the gear portion 512 also has a plurality of recesses 712 distributed circumferentially around the mounting holes 711. Referring to FIG. 13, two ends of the gear portion 512 of the synchronizing swing arm 51 have a plurality of bosses 514, and the plurality of bosses 514 are distributed circumferentially around the two ends of the gear portion 512. The plurality of bosses 514 can engage with the plurality of recesses 712 to achieve cooperation between the synchronizing swing arm 51 with the two self-locking plates 71.

In some examples, the synchronizing gear 52 may also have a plurality of bosses 514 at two ends of the synchronizing gear 52, and the bosses 514 at the ends of the synchronizing gear 52 are fit in the corresponding recesses 712 around the mounting hole 711 in the self-locking plate 71.

When the foldable hinge is in the unfolded state, the plurality of bosses 514 are within the plurality of recesses 712. In a process of folding the foldable hinge, a sufficiently large external force is applied to perform the folding, so that the bosses 514 slide out of the recesses 712, the locking spring 72 is compressed, and the two self-locking plates 71 move away from each other. Since one of the self-locking plates 71 abuts against the end of the friction segment 151 of the mounting shaft 15, this self-locking plate 71 may drive the mounting shaft 15 to move axially when this self-locking plate 71 moves away from the gear portion 512 of the synchronous swing arm 51, causing the mounting shaft 15 to move into the damping ring 60. Since the snap plate 74 is snapped in the snap slot 153 of the mounting shaft 15, the snap plate 74 is fixed relative to the mounting shaft 15. When the mounting shaft 15 moves, the snap plate 74 squeezes the locking spring 72 through the spring stop 73. The spring force of the locking spring 72 is equivalent to resistance, which hinders the rotation of the synchronous swing arm 51. That is, the electronic device cannot be folded when the external force is not sufficient to overcome the spring force of the locking spring 72, such that the foldable hinge can lock the electronic device in the unfolded state.

Similarly, when the foldable hinge is in the folded state, the plurality of bosses 514 are within the plurality of recesses 712, such that the foldable hinge can lock the electronic device in the folded state.

Figure 17:
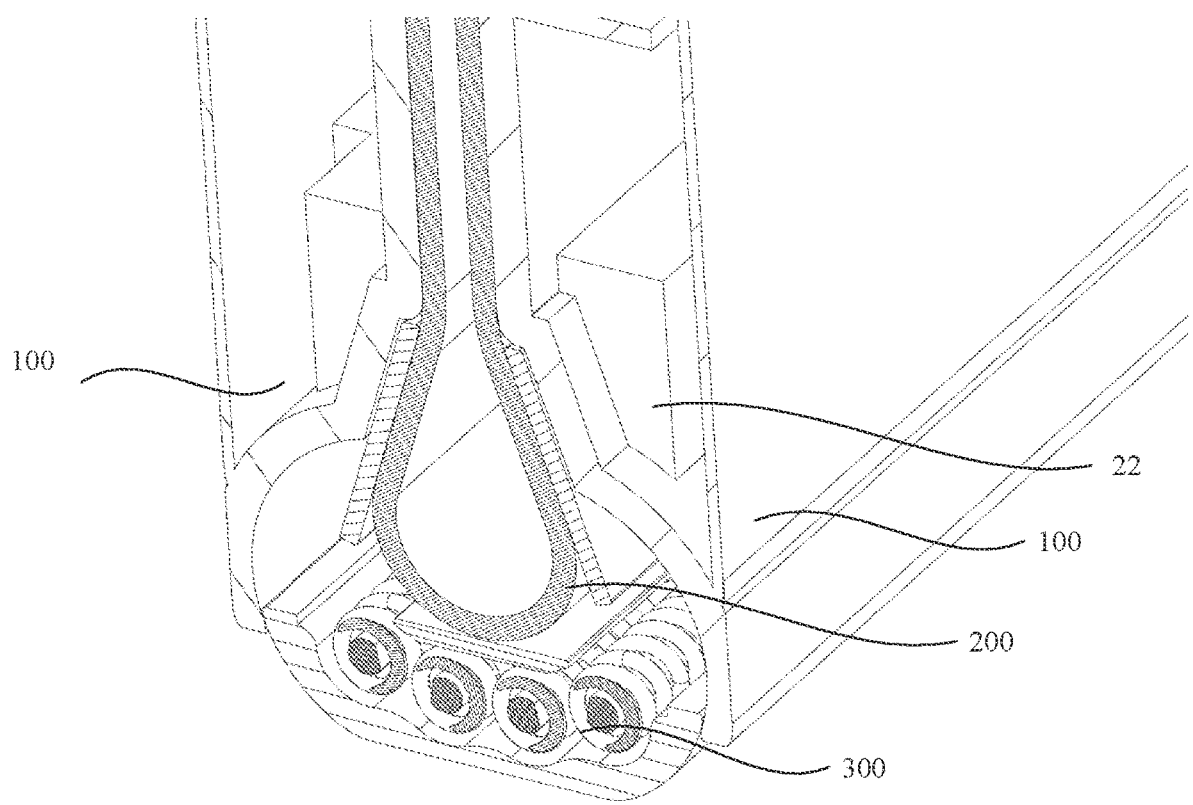
FIG. 17 is a schematic diagram showing an electronic device in accordance with an embodiment of the present disclosure.

FIG. 17 is a schematic diagram showing an electronic device in accordance with an embodiment of the present disclosure. As shown in FIG. 17, the electronic device includes two housings 100, a flexible screen 200, and a foldable hinge 300. The two housings 100 are coupled to rotating arms 22 of the two folding assemblies 20 correspondingly, and the flexible screen 200 is coupled to the two housings 100.

As shown in FIG. 17, two ends of the flexible screen 200 are coupled to the two housings 100 correspondingly. Since the foldable hinge is slidable the support member 21 relative to the base in the direction approaching and away from the base 10 during folding and unfolding, and the support member 21 is rotatably arranged on the rotating arm 22, the support member 21 can perform sliding and rotating actions relative to the base 10 during folding and unfolding of the two housings 100. Thus, during the folding and unfolding process, an action trajectory of the two support members 21 follow a folding and unfolding trajectory of the flexible screen 200. When the two housings 100 are brought together, a distance between portions of two support members 21 coupled to the rotating arms 22 is smaller than a distance between portions of the two support members 21 coupled to the base 10, and the two support members 21 and the base 10 enclose a drop-shaped receiving space. No squeeze, compression or damage will be produced on the flexible screen 200 when the flexible screen 200 is received in the drop-shaped receiving space. The drop-shaped receiving space is also conducive to the use effect and stability of the mobile terminal.

Figure 18:
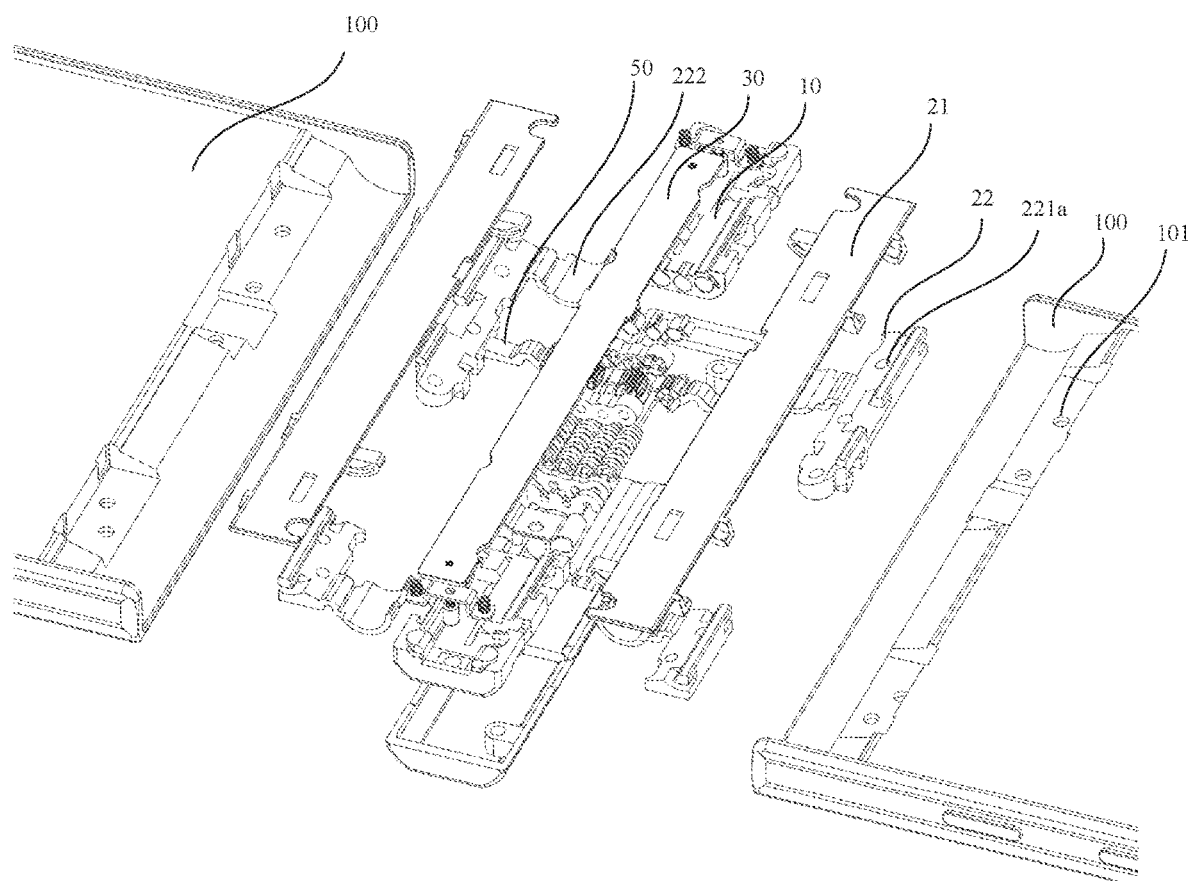
FIG. 18 is an exploded view of an electronic device in accordance with an embodiment of the present disclosure.

FIG. 18 is an exploded view of an electronic device in accordance with an embodiment of the present disclosure. As shown in FIG. 18, the housing 100 has a fixing hole 101 on a side of the housing 100 close to the rotating arm 22. The two rotating arms 22 are fixedly coupled to the two housings 100 by screws, correspondingly. For example, as shown in FIG. 18, screws are installed into the connection holes 221a of the rotating arms 22 and the fixing holes 101 of the housing 100 to couple the rotating arms 22 to the housing 100.

Only some embodiments of the present disclosure are described above and they are not intended to limit the present disclosure. Any modification, equivalent alternative, improvement, or the like made within the principles of the present disclosure shall be included in the protection scope of the present disclosure.

The invention claimed is:

1. A foldable hinge, comprising:
a base; and
two folding assemblies on both sides of the base and coupled to the base, the two folding assemblies being foldable relative to each other,
wherein each folding assembly comprises a rotating arm and a support member, the support member comprises a connection block and a first support plate, a first end of the rotating arm being rotatably coupled to the base, the support member being rotatably coupled to a second end of the rotating arm away from the base, a side of the support member close to the base being rotatably coupled to the base, and the support member being slidable in a direction approaching or away from the base;
wherein a distance between portions of two support members coupled to the rotating arms is smaller than a distance between portions of the two support members coupled to the base, in response to bringing the two folding assemblies together;
a portion of the connection block protrudes relative to aside edge of the first support plate close to the base, and the portion of the connection block has a support surface;
the foldable hinge further comprises a second support plate between the two folding assemblies, and the second support plate is movably coupled to the base and is movable relative to the base in a direction approaching or away from the base;
the portion of the connection block is on a side of the second support plate close to the base, and the support surface is in contact with a surface of the second support plate close to the base, in response to unfolding the two folding assemblies; and the support surface is separated from the second support plate in response to bringing the two folding assemblies together.

2. The foldable hinge according to claim 1, wherein: a surface of the base coupled to the folding assembly comprises a first circular arc groove; and the rotating arm comprises a first body portion and a first arc arm, an end of the first arc arm being coupled to the first body portion, and the first arc arm being in the first circular arc groove and is slidable along the first circular arc groove.

3. The foldable hinge according to claim 2, wherein: the first body portion has a second circular arc groove, an axis of the second circular arc groove being parallel to an axis of the first arc arm; and the support member comprises a second arc arm, an end of the second arc arm being coupled to the first support plate, and the second arc arm being in the second circular arc groove and is slidable along the second circular arc groove.

4. The foldable hinge according to claim 3, wherein: the surface of the base further comprises a first recess, the first recess is on aside of the first circular arc groove, and a side wall of the first recess has a pin shaft; the connection block and the second arc arm are on a common side of the first support plate, and the connection block is coupled to the first support plate; and a half-moon-shaped side wall of the connection block has a first guiding sliding slot, the connection block being in the first recess, and the pin shaft being in the first guiding sliding slot.

5. The foldable hinge according to claim 4, wherein the first guiding sliding slot exhibits a circular arc shape.

6. The foldable hinge according to claim 4, wherein: a surface of the base close to the second support plate has a first mounting slot, and a side wall of the first mounting slot has a limiting recess; the foldable hinge further comprises an elastic member and a connection bracket; the connection bracket comprises a second body portion and a limiting portion, the second body portion being in the first mounting slot, and the limiting portion being in the limiting recess; the elastic member is in the limiting recess, and the elastic member is between the limiting portion and aside wall of the limiting recess; and the second body portion is coupled to the second support plate.

7. The foldable hinge according to claim 6, wherein the foldable hinge further comprises a guide member; the first mounting slot having a guide hole in a bottom of the first mounting slot; and the guide member having a first end coupled to the connection bracket and a second end inserted in the guide hole.

8. The foldable hinge according to claim 2, wherein the foldable hinge further comprises a synchronization assembly, the synchronization assembly is in the base, and the synchronization assembly is coupled to the two folding assemblies.

9. The foldable hinge according to claim 8, wherein the synchronization assembly comprises two synchronizing swing arms extending to both sides of the base correspondingly; the two synchronizing swing arms are transmissively coupled; and each synchronizing swing arm has a first end rotatably coupled to the base and a second end slidingly coupled to the first body portion.

10. The foldable hinge according to claim 9, wherein: the first body portion has a second recess on a side wall of the first body portion close to the base, and a side wall of the second recess has a second guiding sliding slot; and the second end of the synchronizing swing arm away from the base has a connection shaft, and the connection shaft is in the second guiding sliding slot.

11. The foldable hinge according to claim 10, wherein: the synchronizing swing arm comprises a gear portion and a third body portion, and the gear portion and the connection shaft are at two ends of the third body portion, correspondingly; and the gear portions of the two synchronizing swing arms are transmissively coupled in an engaging manner.

12. The foldable hinge according to claim 11, further comprising a mounting shaft in the base and a damping ring fitted over the mounting shaft, wherein the mounting shaft is coaxially inserted in the gear portion and circumferentially limited by the gear portion; and wherein the damping ring is in interference fit with the mounting shaft and is fixedly coupled to the base.

13. The foldable hinge according to claim 9, wherein each synchronization assembly further comprises a plurality of synchronizing gears engaging with each other, and the gear portions of the two synchronizing swing arms are transmissively coupled by the plurality of synchronizing gears.

14. The foldable hinge according to claim 13, further comprising a mounting shaft in the base and a damping ring fitted over the mounting shaft, wherein the mounting shaft is coaxially inserted in the synchronizing gear and circumferentially limited by the synchronizing gear; and wherein the damping ring is in interference fit with the mounting shaft and is fixedly coupled to the base.

15. The foldable hinge according to claim 1, further comprising a mounting shaft in the base; wherein the mounting shaft comprises a friction segment and a mounting segment, the friction segment being at a first end of the mounting segment, and the mounting segment having a snap slot at a second end of the mounting segment away from the friction segment.

16. The foldable hinge according to claim 15, further comprising a damping ring, wherein aside wall of the base has a damping ring mounting hole, and the damping ring is fixedly mounted in the damping ring mounting hole; and wherein the damping ring comprises a C-shaped segment and a turnup segment, the C-shaped segment being a columnar structure with a C-shaped cross-section, and the turnup segment being coupled to both ends of the C-shaped segment.

17. The foldable hinge according to claim 16, wherein the turnup segment is fitted with the damping ring mounting hole; the C-shaped segment is fitted over the friction segment; and an outer diameter of the friction segment is greater than an inner diameter of the C-shaped segment.

18. The foldable hinge according to claim 15, further comprising two self- locking plates, a locking spring, a spring stop, a snap plate, and an insertion tail plate; wherein both self-locking plates are fitted over the mounting segment, with one of the self-locking plates abutting an end of the friction segment; the locking spring and the spring stop are sequentially fitted over the mounting segment, and the locking spring is on aside of the two self-locking plates away from the mounting segment and abuts against one of the two self-locking plates farther away from the mounting segment; the spring stop is at an end of the locking spring away from the self-locking plate and abuts against the locking spring; the snap plate is snapped at the snap slot; and the insertion tail plate is coupled to the base and is at an end of the mounting shaft away from the friction segment.

19. An electronic device, comprising two housings, a flexible screen, and a foldable hinge, wherein:

the foldable hinge comprises a base; and two folding assemblies on both sides of the base and coupled to the base, the two folding assemblies being foldable relative to each other;

each folding assembly comprises a rotating arm and a support member, the support member comprises a connection block and a first support plate, a first end of the rotating arm is rotatably coupled to the base, the support member is rotatably coupled to a second end of the rotating arm away from the base, a side of the support member close to the base is rotatably coupled to the base, and the support member is slidable in a direction approaching or away from the base;

a distance between portions of two support members coupled to the rotating arms is smaller than a distance between portions of the two support members coupled to the base, in response to bringing the two folding assemblies together;

the two housings are coupled to rotating arms of the two folding assemblies correspondingly, and the flexible screen is coupled to the two housings;

a portion of the connection block protrudes relative to aside edge of the first support plate close to the base, and the portion of the connection block has a support surface;

the foldable hinge further comprises a second support plate between the two folding assemblies, and the second support plate is movably coupled to the base and is movable relative to the base in a direction approaching or away from the base;

the portion of the connection block is on a side of the second support plate close to the base, and the support surface is in contact with a surface of the second support plate close to the base, in response to unfolding the two folding assemblies; and the support surface is separated from the second support plate in response to bringing the two folding assemblies together.

\* \* \* \* \*